US005543208A

United States Patent [19]

Hasler

[11] Patent Number: 5,543,208

[45] Date of Patent: Aug. 6, 1996

[54] RESISTIVE FILM

[75] Inventor: Peter Hasler, Mauren, Liechtenstein

[73] Assignee: RMT Reinhardt Microtech AG, Wang, Switzerland

[21] Appl. No.: 372,076

[22] Filed: Jan. 12, 1995

[30] Foreign Application Priority Data

Jan. 13, 1994 [CH] Switzerland ........................ 00 099/94

[51] Int. Cl.[6] ........................................................ B32B 9/00

[52] U.S. Cl. ........................... 428/210; 428/209; 428/457; 361/767; 174/261

[58] Field of Search ..................................... 428/210, 209, 428/457; 361/767; 174/261

[56] References Cited

FOREIGN PATENT DOCUMENTS 2125578 9/1972 France .
2204420 9/1972 Germany .
1338735 11/1973 United Kingdom .

OTHER PUBLICATIONS

Patent Abstracts of Japan, vol. 3, No. 117 (E–141) Sep. 29, 1979 of JP–A–54 094 696 (Matsushita Electric Ind. Co., Ltd) Jul. 26, 1979.

R. Kaneoya, "Studies of High–Accuracy Ni–Cr Thin–Film Resistors"; *Electronic and Communications in Japan*, vol. 52–C, No. 11, (1969), pp. 162–170.

*Primary Examiner*—Patrick J. Ryan
*Assistant Examiner*—Cathy Lee
*Attorney, Agent, or Firm*—Frishauf, Holtz, Goodman, Langer & Chick, P.C.

[57] ABSTRACT

A resistive layer with the elements nickel, chromium, aluminum, cooper and silicon has a low temperature coefficient and a high degree of long-time stability. The copper content is to 5.5 weight-% and the silicon content is 0.5 to 1.6 weight-%, respectively in relation to aluminum, and the ratio of Ni: Cr: AlSiCu is within a range which is defined by a hexagon ABCDEF shown in FIG. 1, the corner points of which are provided by the following compositions in weight-%:

| | | | |
|---|---|---|---|
| A | 58 Ni | 40 Cr | 2 AlSiCu |
| B | 52 Ni | 33 Cr | 15 AlSiCu |
| C | 32 Ni | 33 Cr | 35 AlSiCu |
| D | 13 Ni | 52 Cr | 35 AlSiCu |
| E | 13 Ni | 75 Cr | 12 AlSiCu |
| F | 18 Ni | 80 Cr | 2 AlSiCu. |

4 Claims, 2 Drawing Sheets

RESISTIVE FILM

FIELD OF THE INVENTION

The present invention relates to an electrical resistive film containing nickel, chromium and aluminum/silicon/copper.

BACKGROUND

Metallic film or resistive film resistors are widely known in the electronic field. The resistive films often consist of a nickel-chromium alloy (Ni—Cr), which is applied in a vacuum, for example by sputtering or in recent times more frequently by cathodic evaporation, to a suitable substrate and both are provided with a suitable diffusion barrier and a contacting layer to provide an electrical connection to the resistive film.

Resistive films of Ni—Cr alloys are distinguished by a small coefficient of temperature (TK) and good stability over extended periods of time. The coefficient of temperature is usually given in ppm/° C. $=(1/R)(\Delta R/\Delta T)(10^6)$. The long-time stability is understood to be the relative change in resistance ($\Delta R/R\cdot 100\%$) which a resistor undergoes after storage over 1000 or 10000 hours at increased temperatures of 125 to 150° C. Typical values for the temperature coefficient of an Ni—Cr resistive film are less than 50 ppm/° C., and the stability values lie between 0.1 to 0.25%.

However, due to their wide range of uses, the need has increased for resistive films with even more greatly improved properties. For example, it is known that long-time stability is mainly determined by the oxidation resistance of the resistive films. To improve long term stability, typically, the resistive films are subjected to pre-aging for two to twelve hours at 200° to 300° C. The oxide layer being generated on the surface in the course of pre-aging protects the film to a large degree against further oxidation during use and thereby improves the stability of the resistive metal films.

To further improve the long-time stability, R. Kaneoya has suggested in "Electrom. and Communications in Japan", vol 52-C, No. 11, 1969, pp. 162 to 170, to add another metal to the Ni—Cr alloy, such as Al, Si, Be, which is known to form a stable oxide. Kaneoya produced ternary NiCr alloys with Be, Si or Sn, and quaternary NiCr alloys with BeAl or SiAl. Kaneoya has found NiCrSi to be the most advantageous alloy, having a TK<10 ppm/° C. and a long-time stability of 0.01% after 1000 hours at 100° C. However, a disadvantage in the resistive films discovered by Kaneoya is that they must be hermetically encapsulated in order to achieve the above mentioned long-time stability. This makes the manufacturing process more extensive and as a result, the resistors are more expensive. Another disadvantage is that the simultaneous vaporization of more than two elements in an evaporation installation is extremely difficult in practice, so that the reproducibility of the films is poor.

Resistive NiCr films with a high Al content have also already been disclosed (German Published, Non-Examined Patent Application DE-OS 22 04 420 and E Schippel, "Kristall und Technik" [Crystal and Technology] 11 (1973) 1983). But these films have not gained any importance in commerce up to now, probably because of manufacturing problems.

BRIEF DESCRIPTION OF THE INVENTION

It is therefore the object of the present invention to make available an improved resistive film which is cost-efficient in manufacturing and has a small temperature coefficient and a high degree of long-time stability.

In accordance with the invention this object was attained by finding a resistive film which contains the elements nickel (Ni), chromium (Cr), aluminum (Al), copper (Cu) and silicon (Si), wherein the copper content is 1 to 5.5 weight-% and the silicon content is 0.5 to 1.6 weight-%, respectively in relation to aluminum, and the ratio of Ni: Cr: AlSiCu is within a range which is defined by a hexagon ABCDEF, the corner points of which are provided by the following compositions in weight-% (FIG. 1):

| | | | |
|---|---|---|---|
| A | 58 Ni | 40 Cr | 2 AlSiCu |
| B | 52 Ni | 33 Cr | 15 AlSiCu |
| C | 32 Ni | 33 Cr | 35 AlSiCu |
| D | 13 Ni | 52 Cr | 35 AlSiCu |
| E | 13 Ni | 75 Cr | 12 AlSiCu |
| F | 18 Ni | 80 Cr | 2 AlSiCu |

DETAILED DESCRIPTION OF THE INVENTION

Figure 2A:
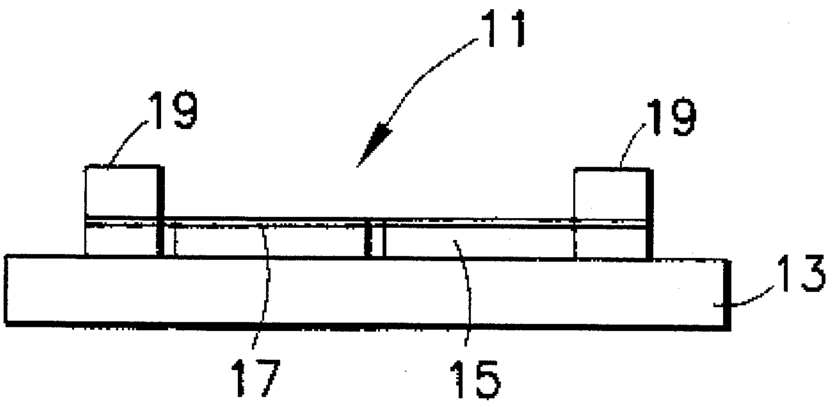
FIGS. 2*a* and 2*b* show a resistive film resistor.
Figure 2B:
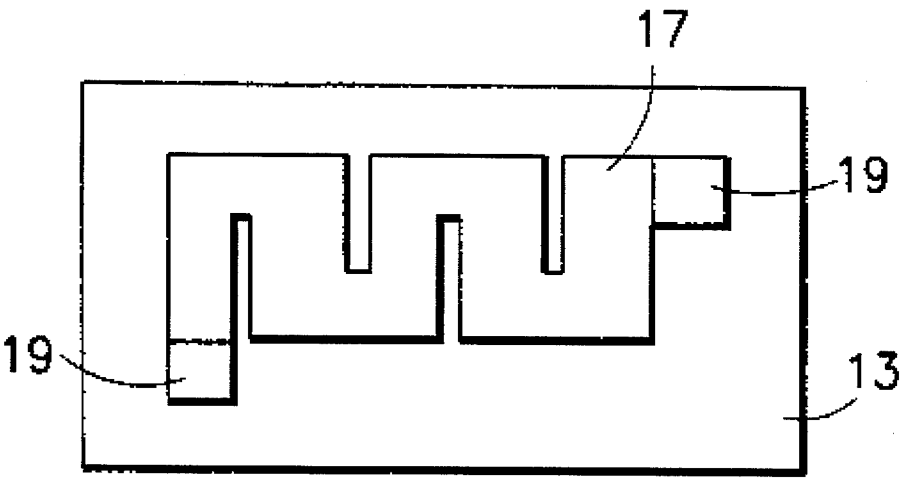

FIGS. 2*a* and 2*b* show a film resistor (11) having a substrate (13) on which is formed the resistive metal film (15) protected by diffusion barrier (17) from contacts (19).

In accordance with the invention the object was attained by finding a resistive film which contains the elements nickel (Ni), chromium (Cr), aluminum (Al), copper (Cu) and silicon (Si), wherein the copper content is 1 to 5.5 weight-% and the silicon content is 0.5 to 1.6 weight-%, respectively in relation to aluminum, and the ratio of Ni: Cr: AlSiCu is within a range which is defined by a hexagon ABCDEF, the corner points of which are provided by the following compositions in weight-% (FIG. 1):

| | | | |
|---|---|---|---|
| A | 58 Ni | 40 Cr | 2 AlSiCu |
| B | 52 Ni | 33 Cr | 15 AlSiCu |
| C | 32 Ni | 33 Cr | 35 AlSiCu |
| D | 13 Ni | 52 Cr | 35 AlSiCu |
| E | 13 Ni | 75 Cr | 12 AlSiCu |
| F | 18 Ni | 80 Cr | 2 AlSiCu. |

As noted above, the ranges for Si and Cu vary within limits and with respect to Al are: Si 0.5 to 1.6%; Cu 1.0–5.5%; and the above numbers are rounded.

More precise representation for the compositions represented by 2, 15, 35 and 12 AlSiCu listed above are as follows:

2 AlSiCu=(1.858–1.970)%Al+(0.01–0.032)%Si+(0.02–0.11)%Cu

15 AlSiCu=(13.935–14.775)%Al+(0.075–0.240)%Si+(0.150–0.825)%Cu

35 AlSiCu=(32.515–34.475)%Al+(0.175–0.560)%Si+(0.350–1.925)%Cu

12 AlSiCu=(11.148–11.820)%Al+(0.060–0.192)%Si+(0.120–0.660)%Cu.

Resistive films of the inventive compositions are distinguished by a high degree of long-time stability and a low coefficient of temperature. In contrast to the ternary and quaternary resistive films produced by R. Kaneoya, it is not necessary to encapsulate resistive films in accordance with the present invention. Because of this it is possible to lower the production costs considerably.

The ratio of Ni:Cr:AlSiCu preferably lies in a range defined by the rectangle of DEFG (G=Ni:Cr:AlSiCu= 38:60:2). Resistive films having these compositions can be produced with the aid of presently commercially available pre-alloyed targets.

The production of the resistive films in accordance with the invention can take place using known deposition methods. Although it is basically possible to evaporate the elements for creating a quinary alloy simultaneously in an appropriate installation, this requires extensive controls to attain sufficient reproducibility. At present such an installation is not commercially available. Therefore to prepare the alloy, at least two elements are advantageously combined in a pre-alloy. This simplifies the production method. It has been shown to be extremely advantageous to pre-alloy Ni and Cr on the one hand and Al, Si and Cu on the other. Such pre-alloys are already commercially available in certain compositions. The use of other pre-alloys, however, is also possible.

By employing pre-alloys it is possible to produce the resistive films of the invention in conventional installations, such as the LLS 900 from Balzers Aktiengesellschaft, 9496 Balzers, Principality of Liechtenstein. The LLS 900 installation is a cathodic atomizing installation and can be equipped with a total of five planar magnetrons, wherein respectively two planar magnetrons can be simultaneously operated. The planar magnetrons are vertically disposed in the wall of the process chamber. In this case the targets placed in the planar magnetrons are made of the material used for producing the film. For deposition, the substrates are vertically inserted into a drum of the LLS 900, which moves along the planar magnetrons during the deposition process. The speed of rotation is normally approximately 50 rpm. The cathode atomizing technique is well-known and is extensively described, for example by H. Frey and G. Kienel in "Dünnschichttechnology" [Thin Film Technology], D üsseldorf 1987, Sect. 4.7.

Alternatively, the production of resistive films can take place using known flash evaporation in a high vacuum methods, employing the elements or suitable pre-alloys of these elements These are described in L. I. Maissel, R. Glang, "Handbook of Thin Film Technology", N.Y. 1970, Sect 1. Evaporation can also be performed by means of electron beam evaporation as described, for example, in H. Frey and G. Kienel, "Dünnschichttechnology" [Thin Film Technology] (supra), Sect. 3.3.

EXAMPLES

A cathodic atomizing installation of the type LLS 900 (discussed above) was used for producing a film resistor of the type comprising (1) a resistive film, (2) a diffusion barrier made of TiW and (3) a contacting layer made of Pd and Au.

An aluminum oxide substrate such as the one available from the Coors company as ADS 996 (purity approximately 99.6%) was used as the substrate material.

The invention is in the composition of the resistive film. Other known substrate materials, such as ceramics made of $Al_2O_3$, glass, oxidized silicon wafers or the like can also be employed. But it should be noted that, depending on the substrate material used or the substrate composition, the process parameters need to be adapted correspondingly according to known principles.

Furthermore any usual diffusion barrier material cab be employed, e.g. TiW, Ti or Mo. Similarly the contact layer or contact can be any usual contact material such as Pd, Au, Al, Ni and Cu.

For these examples, five different targets (which can be obtained from Balzers Aktiengesellschaft, Liechtenstein, for example) were used for producing the film resistor:

| | Target | Composition | Purity |
|---|---|---|---|
| 1. | NiCr | 30/70 | 99.9 |
| 2. | AlSiCu | 94/1/5 | 99.9 |
| 3. | TiW | 10/90 | 99.99 |
| 4. | Pd | | 99.95 |
| 5. | Au | | 99.99 |

The individual process steps for manufacturing the film resistor are as follows:

1. Loading the process chamber and subsequent evacuation thereof until a vacuum of approximately $2 \cdot 10^{-6}$ mbar has been attained.

2. Setting a process pressure of approximately $2 \cdot 10^{-3}$ mbar by admitting argon of a purity of 99.998% into the process chamber. Switching on the rotating drive for the substrate support.

3. Simultaneous atomizing (sputtering) of the NiCr and the AlSiCu targets: The output selected in this case is between approximately 0.5 and 2 kW, so that growth rates between approximately 0.03 and approximately 0.1 nm or 1 Å per second result. The sputtering time in this case is a function of the desired film thickness and usually lies between 4 and 10 minutes. The substrate temperature can be between 150° C. and 250° C.

4. Atomizing the TiW target for applying the diffusion barrier: This process step is less critical, so that it is possible to set a higher sputtering output or growth rate.

5. Atomizing the palladium target.

6. Atomizing the gold target.

7. Stopping the inflow of argon, turning off the rotating drive, returning normal pressure to the process chamber and removing the substrate.

8. Forming the structures in a known manner, and final tempering (annealing) of the substrates at approximately 350° C. over approximately two hours.

The NiCrAlSiCu alloy is suitable for producing film resistors with a resistance value between approximately 20 Ohm/sq. to 300 Ohm/sq., particularly advantageously for those with a resistance value between approximately 50 Ohm/sq. to 200 Ohm/sq. (sq.=square=unit of area). The temperature coefficient properties of the resistor can be adapted to the desired value by varying the applied amounts of AlSiCu. The aging temperature (annealing) for the film resistors can be between 300 and 350° C. with all substrate types.

The process data for producing a film resistor having an area resistance of 100 Ohm/sq. will be described in what follows (steps 3 to 6; above):

| Target | Output (kW) | Rate (nm/s) | Sputter time(s) |
|---|---|---|---|
| NiCr | 1.5 | 0.07 | 320 |
| AlSiCu | 0.9 | 0.045 | 320 |
| TiW | 3.0 | 0.2 | 260 |
| Pd | 3.0 | 0.6 | 180 |
| Au | 2.5 | 0.6 | 180 |

The film resistor produced, having the above process parameters, has the following specifications:

| | |
|---|---|
| Temperature coefficient: | +/− 5 ppm/°C. (between - 55 and 150° C.) |
| Long-time stability: | <300 ppm (Storage at 150° C. over 1000 hours) |

Various changes and modifications may be made, and features described in connection with any one of the embodiments may be used with any of the others, within the scope of the inventive concept.

Figure 1:
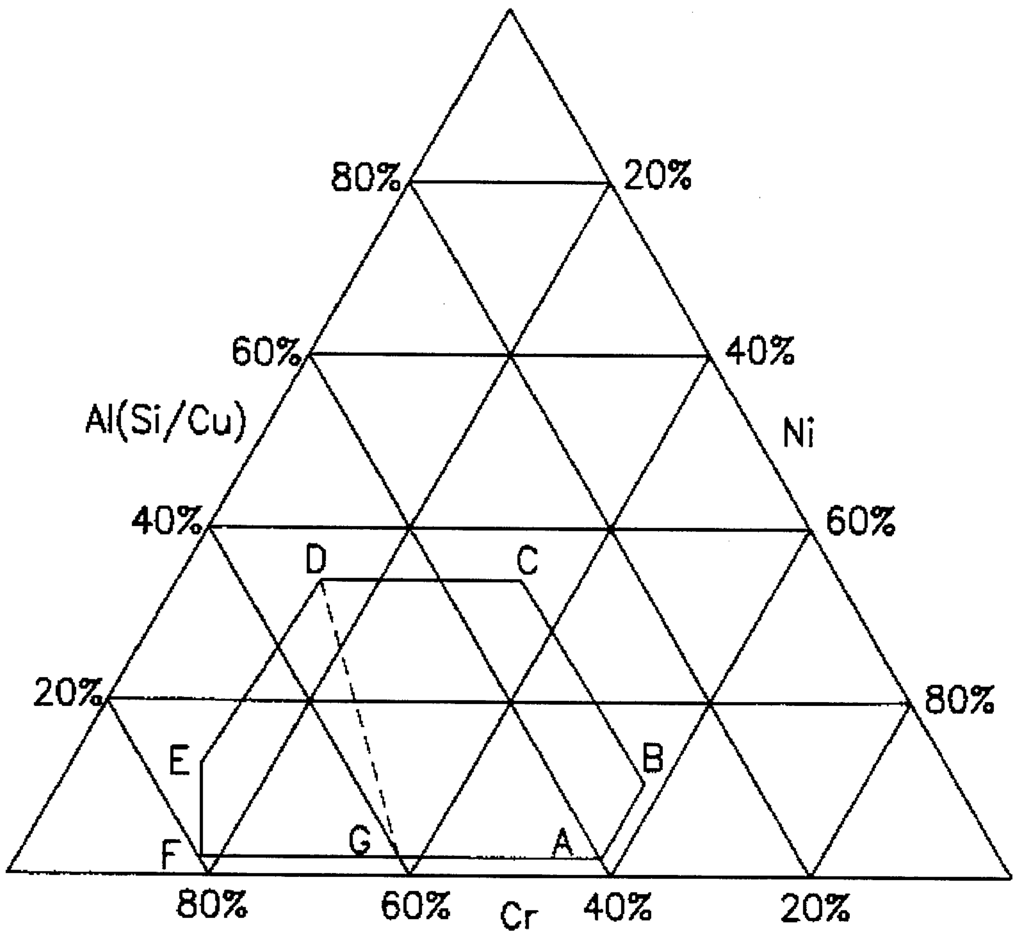
FIG. 1 shows a tertiary diagram defining the composition of the inventive resistive film.

What is claimed is:

1. A resistive film, containing the elements nickel (Ni), chromium (Cr), aluminum (Al), copper (Cu) and silicon (Si), wherein the copper content is 1 to 5.5 weight-% and the silicon content is 0.5 to 1.6 weight-%, respectively in relation to aluminum, and the ratio of Ni: Cr: AlSiCu is within a range which is defined by a hexagon ABCDEF, the corner points of which are provided by the following compositions in weight-%:

| | | | |
|---|---|---|---|
| A | 58 Ni | 40 Cr | 2 AlSiCu |
| B | 52 Ni | 33 Cr | 15 AlSiCu |
| C | 32 Ni | 33 Cr | 35 AlSiCu |
| D | 13 Ni | 52 Cr | 35 AlSiCu |
| E | 13 Ni | 75 Cr | 12 AlSiCu |
| F | 18 Ni | 80 Cr | 2 AlSiCu |

as shown in FIG. 1.

2. A resistive film in accordance with claim 1, wherein the ratio of Ni: Cr: AlSiCu lies in a range which is defined by the rectangle DEFG as shown in FIG. 1.

3. A film resistor comprising a resistive film in accordance with claim 1, two contacts and a diffusion barrier, said contacts being spaced from each other and disposed on the resistive film and further being separated from the resistive film by the diffusion barrier.

4. The film resistor in accordance with claim 3, wherein the diffusion barrier contains TiW, Ti or Mo, and the contacting layer contains at least one of the elements Pd, Au, Al, Ni or Cu.

* * * * *